April 25, 1961     E. J. STECHER     2,981,394
BOTTLE ORIENTING DEVICE

Filed June 24, 1959     3 Sheets-Sheet 1

EDWARD J. STECHER
INVENTOR.

BY *Edward A. Conroy, Jr.*
ATTORNEY

April 25, 1961    E. J. STECHER    2,981,394
BOTTLE ORIENTING DEVICE
Filed June 24, 1959    3 Sheets-Sheet 2
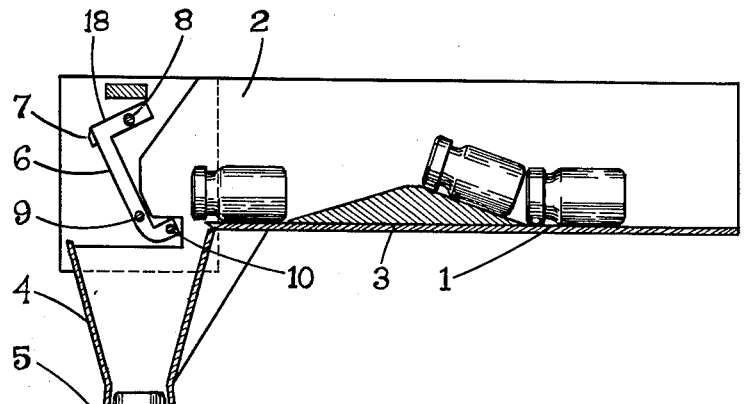
*Fig. 2.*
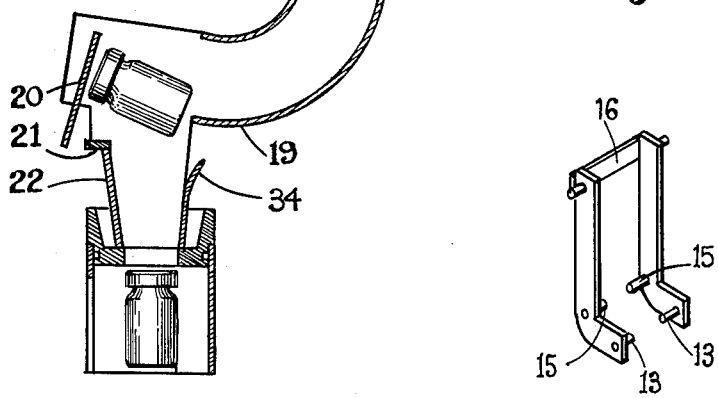
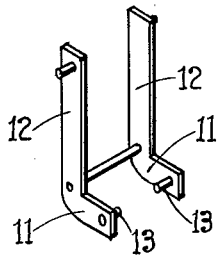
*Fig. 5.*
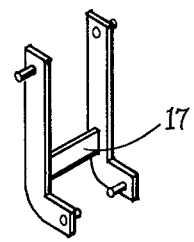
*Fig. 6.*
EDWARD J. STECHER
INVENTOR.
BY Edward A. Conroy, Jr.
ATTORNEY April 25, 1961  E. J. STECHER  2,981,394
BOTTLE ORIENTING DEVICE
Filed June 24, 1959  3 Sheets-Sheet 3

EDWARD J. STECHER
INVENTOR.

BY
ATTORNEY

United States Patent Office
2,981,394
Patented Apr. 25, 1961

2,981,394

BOTTLE ORIENTING DEVICE

Edward J. Stecher, Nanuet, N.Y., assignor to American Cyanamid Company, New York, N.Y., a corporation of Maine Filed June 24, 1959, Ser. No. 822,507

3 Claims. (Cl. 193—43)

The present invention relates to an article handling device, and more particularly to a device for delivering in an upright position capped bottles which are presented to the device from a trough through which the capped bottles are moving in a random manner, save that the long axis of all the capped bottles in the trough form one continuous line in the trough.

The present known "trapeze" method of uniformly orienting the position of moving bottles on assembly lines performs adequately in most instances. The "trapeze" of the bottle handling art is similar in all material respects to the trapeze of circus fame, and its operation is as follows.

The usual assembly line practice is to construct a horizontal trough which terminates in a vertical chute. Capped bottles are pushed through the trough in a lengthwise manner, that is to say, cap-to-cap, bottom-to-bottom, or cap-to-bottom, as the case may be. As each bottle reaches the end of the trough it tips over, due to its center of gravity being beyond the end of the floor of the trough, and falls downward through the chute. The chute is usually constructed with a diameter only slightly larger than the diameter of the bottles being used. Such an arrangement alone would accomplish nothing since it delivers the bottles through the chute in the same orientation in which they are passing through the trough. That is to say, a capped bottle which emerges from the trough bottom-first tips over and falls through the chute bottom-first, whereas a capped bottle which emerges from the trough cap-first tips over and falls through the chute cap-first.

If now, however, a trapeze is properly suspended above the vertical chute and at the end of the horizontal trough, a different result is obtained. The two parallel vertical bars of tthe trapeze and the horizontal bar of the trapeze are usually rigidly constructed integrally of some metal, and the trapeze is so suspended as to swing freely on its upper pivots. Furthermore, this trapeze is so positioned and dimensioned that as a capped bottle emerges from the end of the trough cap-first, the cap passes between the vertical bars of the trapeze and above the horizontal bar of the trapeze, whereas if a capped bottle emerges from the end of the trough bottom-first, the diameter of the bottle is such as to prohibit the bottom of the bottle from passing between the vertical bars of the trapeze. As a capped bottle emerges from the end of the trough cap-first, the cap and neck area of the bottle pass between the vertical bars of the trapeze and above the horizontal bar of the trapeze. As the bottle continues to emerge from the end of the trough, either the shoulder of the bottle will contact the vertical bars of the trapeze and push the trapeze before it or the bottle will tilt over and the cap and neck area of the bottle will come to rest upon the horizontal bar of the trapeze. Further emergence of the bottle from the end of the trough results in the cap and neck area of the bottle being suspended upon the horizontal bar of the trapeze, and the shoulder of the bottle pushing against the vertical bars of the trapeze, as the trapeze swings away from the end of the trough. As the bottom of the bottle emerges from the trough, the bottle tilts downward with the horizontal bar of the trapeze as an axis of rotation, and the bottle falls through the chute bottom-first. As a capped bottle emerges from the end of the trough bottom-first, it merely pushes the trapeze before it, since the bottom of the bottle cannot pass between the vertical bars of the trapeze, and eventually tips over and falls through the chute bottom first.

This present known "trapeze" method of delivering in an upright position capped bottles which are moving through a trough in a cap-to-cap, bottom-to-bottom, or cap-to-bottom manner performs adequately only in those cases where the diameter of the bottle is sensibly greater than the diameter of the cap on the bottle. Where the cap and the bottle are of about the same diameter, this present known "trapeze" method fails utterly for the following reason. Since the space between the vertical bars of the trapeze must be such as to permit the cap, but not the bottom of the bottle, to pass therein, a dilemma arises where the cap and the bottle of about the same diameter. If the trapeze is so dimensioned that the bottom of the bottle cannot pass between the vertical bars of the trapeze, then the cap also cannot pass between the vertical bars of the trapeze. Regardless, then, of whether the bottle emerges from the end of the trough cap first or bottom first, it merely pushes the trapeze before it, tilts over the drops. Thus, bottles which emerge from the end of the trough cap first fall through the chute cap-first, and bottles which emerge from the end of the trough bottom-first fall through the chute bottom-first. If the trapeze is so dimensioned that the cap of the bottle can pass between the vertical bars of the trapeze, then the bottom of the bottle also can pass between the vertical bars of the trapeze. In such case, since the line of capped bottles is moving in the trough quite rapidly, the device will jam badly in the area of the trapeze.

This problem of orienting capped bottles wherein the diameter of the cap and the diameter of the bottle are about the same was most serious in the pharmaceutical industry where capped bottles of this type are commonly used.

The present invention solves this problem in the bottle-handling art by means of a novel trapeze which uniformly delivers in a cap-down position through a vertical chute all such capped bottles presented to it from a horizontal trough. Because the novel trapeze of the present invention performs admirably in uniformly delivering such capped bottles through a vertical chute in a cap-down position, it is now possible to design inverting means whereby such capped bottles are delivered in an upright position. Hence, the present invention also provides a novel inverting chute for delivering such capped bottles in an upright position through a delivery chute by means of a novel bumper means.

The bottle-orienting device of the present invention is illustrated in the accompanying drawings, wherein like reference numerals indicate corresponding parts in the several views, and in which:

Figure 2 is a vertical cross-sectional view taken along the lines 2—2 of Figure 1;

Figure 4 is a perspective view of an alternate construction of the novel trapeze of this invention;

Figure 5 is a perspective view of another alternate construction of the novel trapeze of this invention;

Figure 6 is a perspective view of still another alternate construction of the novel trapeze of this invention;

The novel trapeze

Figures 1, 3:
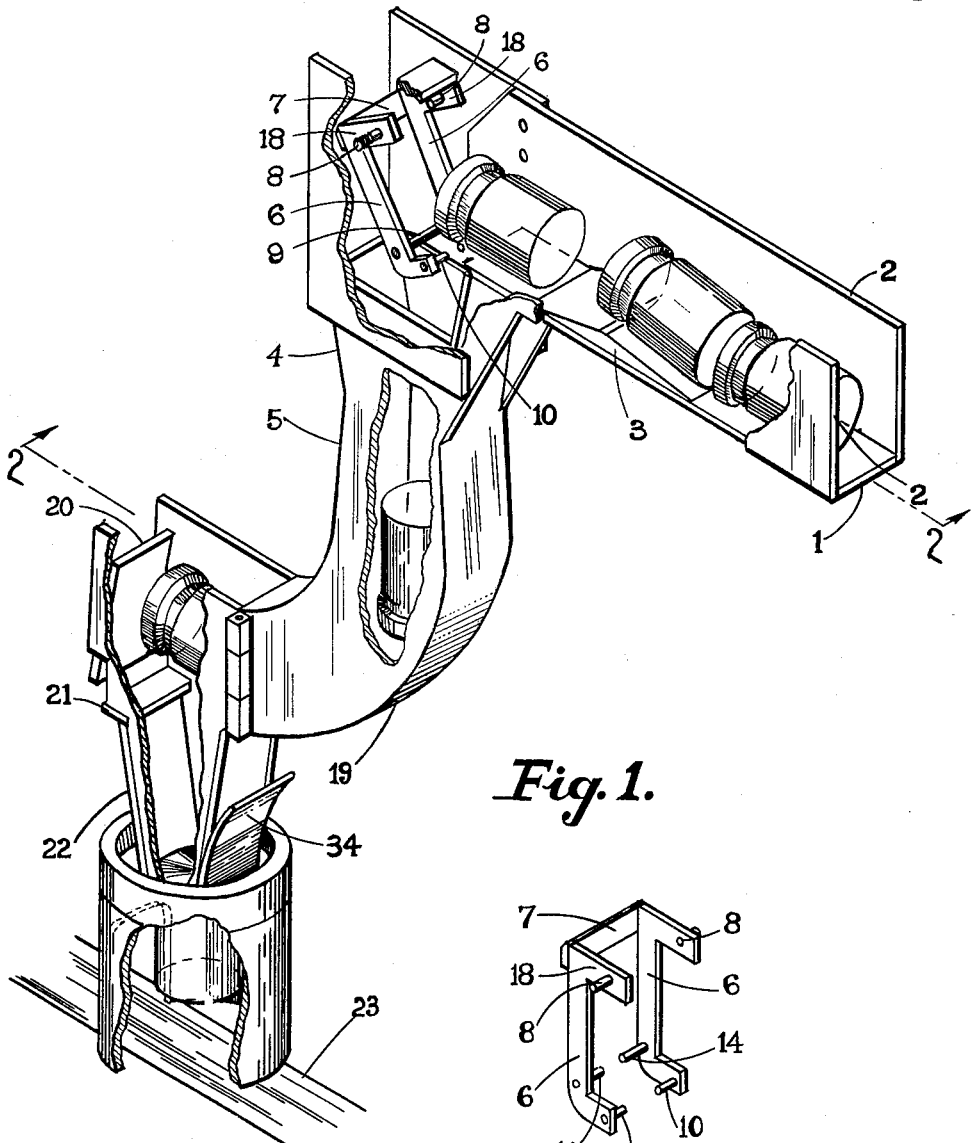
Figure 1 is a perspective view of a bottle-orienting device embodying this invention.
Figure 3 is a perspective view of a preferred embodiment of the novel trapeze of this invention.

The novel trapeze of the present invention differs markedly from the conventional trapeze of the prior art. It is constructed by extending the lower ends of the parallel vertical bars of the conventional trapeze in an arcuate manner down and towards the end of the trough through 90 degrees of arc and then in a straight line towards the end of the trough for a short distance. Viewed from the side, the parallel bars of the novel trapeze of this invention would thus appear L-shaped, with the horizontal bar of the trapeze extending between the vertical sections of the parallel bars of the trapeze at a point just above the right-angle bend. At each end of the horizontal sections of the parallel bars of the trapeze is mounted a short pin, and both of these pins point inwardly towards each other. These pins are so dimensioned as to permit the neck of the capped bottles to be used in the device to pass between them. It is essential, however, that the space between the pins is less than the diameter of the body of the capped bottles to be used in the device, so that the body of the bottles may not pass between the pins. Although I prefer to use pins for the purpose of forming the space through which the neck, but not the body, of the capped bottles may pass, other means may be used such as, for example, bending inwardly each end of the horizontal sections of the parallel bars of the trapeze.

When the novel trapeze of the present invention is positioned above the vertical chute and at the end of the horizontal trough in lieu of the conventional trapeze of the prior art, its operation is as follows. As a capped bottle emerges from the end of the trough cap-first, it reaches a point where its center of gravity is beyond the end of the floor of the trough, and it tilts over. As it tilts over, the constricted neck area passes between the opposing pins at the ends of the horizontal sections of the parallel bars of the trapeze. As it continues to tilt and fall, either the cap of the bottle contacts the horizontal bar between the vertical sections of the parallel bars of the trapeze, or the shoulder of the bottle contacts the opposing pins at the ends of the horizontal sections of the parallel bars of the trapeze, with the result that the trapeze is pushed gently back so as to permit the capped bottle to complete its tilt and fall. With some capped bottles, the neck of the bottle passes through the space between the pins with scarcely any contact of the cap or bottle with the trapeze, and hence virtually no movement of the trapeze. After clearing the trapeze, the capped bottle then falls through the vertical chute in a cap-down position. As a capped bottle emerges from the end of the trough bottom-first, it reaches a point where its center of gravity is beyond the end of the floor of the trough and it tilts over. As it does so, the body of the bottle falls upon and is suspended by the opposing pins at the ends of the horizontal sections of the parallel bars of the trapeze. As the bottle continues to emerge from the end of the trough, it slides over the opposing pins until the bottom of the bottle contacts the horizontal bar between the vertical sections of the parallel bars of the trapeze. Further emergence of the bottle from the end of the trough results in the trapeze swinging away from the end of the trough as it suspends the body of the bottle. As the cap of the bottle clears the end of the floor of the trough, the bottle tilts downward with the opposing pins of the trapeze as an axis of rotation, and the bottle falls through the vertical chute in a cap-down position.

Figure 1 and Figure 2 show the horizontal trough consisting of the floor-plate 1 and side-plates 2. The structure 3 is a ramp and inclined plane whose function will be described hereinafter. At the end of the trough and above the receiving section 4 of the vertical chute 5 is mounted one form of the novel trapeze of this invention consisting of the parallel bars 6, a connecting plate 7, the suspension pivots 8, the horizontal bar 9 between the vertical sections of the parallel bars 6 of the trapeze, and the opposing pins 10 between the ends of the horizontal sections of the parallel bars 6 of the trapeze. A simpler form of the novel trapeze of this invention, as shown in Figure 5, consists of the two horizontal arms 11 extending from the lower ends of the parallel bars 12 of the trapeze and carrying the two opposing pins 13 at the ends thereof. Other forms of the novel trapeze of the present invention are shown in Figure 3 and Figure 4, wherein the center part of the horizontal bar of the trapeze is cut out, leaving a pair of opposing pins 14 and 15, respectively, which are preferably longer than the opposing pins 10 and 13, respectively. If the center part of the horizontal bar of the trapeze is cut out, as shown in Figure 3 and Figure 4, the function of rigidly connecting the parallel bars of the trapeze is performed by the connecting plates 7 and 16, respectively. Another form of the novel trapeze of this invention is shown in Figure 6, wherein the horizontal bar of the trapeze is replaced by the connecting plate 17.

The suspension pivots 8 of the preferred embodiments of the novel trapeze of this invention, as shown in Figures 1, 2 and 3, are mounted on parallel bars 18 affixed at right angles to the upper ends of the vertical sections of the parallel bars of the trapeze. It was found that this preferred form of the novel trapeze could be more delicately suspended than the simpler forms of the novel trapeze, as shown in Figures 4, 5 and 6. The more delicate the suspension of the novel trapeze, the more responsive it is to the slightest pressure of the bottles falling either through or upon it, and thus the smoother is its operation.

Although the novel trapeze of the present invention is particularly adapted for delivering in a cap-down position in a vertical chute bottles whose caps are about the same diameter as the bottles, this novel trapeze also delivers in a cap-down position in a vertical chute bottles whose caps are smaller than the diameter of the bottles. In this latter case, the operation of the novel trapeze of the present invention is quite similar to its operation when bottles whose caps are of about the same diameter as the bottles are being passed through the device. In such case, as a capped bottle emerges from the end of the trough cap-first, it reaches a point where it tilts over. As it does so, the neck or the cap of the bottle passes through the space between the opposing pins at the ends of the horizontal sections of the parallel bars of the trapeze, the trapeze is pushed gently back by the falling bottle, and the bottle completes its fall in a cap-down position through the vertical chute. As such a capped bottle emerges from the end of the trough bottom-first, it reaches a point where it tilts over upon the opposing pins at the ends of the horizontal sections of the parallel bars of the trapeze and is suspended thereby. As the bottle continues to emerge from the end of the trough, the trapeze swings back while suspending the bottom of the bottle until the cap of the bottle clears the end of the trough, at which point the bottle tilts cap-down into the vertical chute and completes its fall in a cap-down position through the vertical chute.

It is an advantage, not readily apparent, of the novel trapeze of the present invention that it delivers in a cap-down position into a vertical chute bottles with caps of various sizes, including bottles whose caps are of greater diameter than the diameter of the body of such bottles.

Fig. 1 and Figure 2 show the ramp and inclined plane 3 which permits smooth operation of the bottle-orienting device of the persent invention even under adverse conditions. When a capped bottle emerges from the end of the horizontal trough bottom-first, it does so by reason of the fact that it is being pushed by the capped bottle immediately behind it in the trough. This contact with the bottle behind continues up to the point where the cap clears the end of the floor of the trough and the bottle begins to tilt cap-downwardly upon the opposing pins at the ends of the horizontal sections of the parallel bars of the trapeze as an axis of rotation. As the bottle begins to tilt cap-downwardly, the cap rubs across the bottom or the cap of the bottle behind, as the case may be. Where the bottles and the caps are made of materials with a low coefficient of friction, no problem is presented, since the cap slides readily across the bottom or the cap of the bottle behind, as the case may be. Under the adverse condition, however, where the bottles and the caps are made of materials with a high coefficient of friction, this contact with the bottle immediately behind in the trough in the case of a bottle emerging bottom-first from the end of the trough can impair the smooth operation of the bottle orienting device of the present invention. It was discovered, however, that this problem is obviated by separating the bottles as they emerge from the end of the trough. This is the function of the ramp and inclined plane 3 shown in Figure 1 and Figure 2. As the line of capped bottles is pushed through the trough by some convenient force at the end thereof, the line of capped bottles ascends the ramp. As the line of capped bottles passes over the apex of the ramp and slides down the inclined plane on the other side, they separate, leaving a small but discrete space between each of the capped bottles as they approach the end of the trough. In order to best perform its function, the ramp and inclined plane 3 should be made of some material with low coefficients of friction. It has been found that best results are obtained when the unit is made of chrome-plated steel, and this is the preferred material.

An advantage of the novel trapeze of the present invention lies in the fact that it may be constructed so as to be easily removable from the bottle-orienting device. Thus, since the dimensions of the trapeze must be varied depending upon the length, diameter, and weight of the bottle and of the cap, the appropriate trapeze to best accommodate a particular combination of bottle and cap may be readily mounted in the bottle-orienting device in order to achieve optimum operating results. Furthermore, the opposing pins may be constructed so as to screw into the ends of the horizontal sections of the parallel bars of the trapeze. Thus, a single trapeze may accommodate numerous combinations of bottles and caps merely by interchanging one set of pins for another.

The inverting chute

The novel inverting chute of the present invention makes it possible to deliver in an upright position capped bottles which are uniformly delivered in an inverted position into a vertical chute. A capped bottle which is to be oriented in an upright position is delivered in an inverted position into a vertical chute by means of the novel trapeze of my invention and is projected downward through the chute by its own momentum in this inverted position. There is provided at the base of the chute an upward curving portion whereby the downward fall of the inverted capped bottle is converted to linear flight at about a 30° angle from the horizontal. At the end of the upward curving portion of the chute, there is provided a bumper plate whereby the linear flight of the capped bottle is converted to pivotal motion and the bottom of the bottle is swung downwardly towards the vertical. At the end of the upward curving portion of the chute, there is also provided a projection to temporarily engage the side of the cap on the bottle whereby the pivotal motion of the bottle is completed and the bottle is aligned in an upright vertical position. The bottle then falls freely through a short vertical delivery chute onto the assembly line.

Figure 1 and Figure 2 show the vertical chute 5 and the inverting chute 19 which is essentially an upward curving portion of the vertical chute 5. At the end of the inverting chute 19, there is shown the bumper plate 20 which is rigidly mounted within the body of the inverting chute 19. At the end of the inverting chute 19, there is also shown the projection 21 which is constructed integrally with the delivery chute 22. Also shown in Figure 1 is an assembly line conveyor belt 23 upon which the upright capped bottles are delivered through the delivery chute 22.

The device as shown and described is entirely automatic. The capped bottles to be oriented are delivered by means of the novel trapeze of this invention in an inverted position into the vertical chute 5 which is shown in the drawings to be square in cross-section, but whose cross-section may be circular, triangular, oval, rectangular, or any convenient shape. The gravitational momentum of the falling, inverted, capped bottles carries them downwardly, and around, and thence linearly at an angle of about 30° from the horizontal until they impinge on the bumper plate 20. The bumper plate 20 is set at such an angle that the cap of each bottle strikes the bumper plate 20 upon the upward side of the outer periphery of the top of the cap. The result of this off-center impact of the capped bottle upon the bumper plate 20 is to convert the linear momentum of the bottle into pivotal momentum. Thus, the bottom of the bottle is swung downwardly in an arcuate manner so that the long axis of the bottle approaches the vertical. The projection 21 is provided to further assist in aligning the falling and pivoting bottle by temporarily engaging the lower side of the cap of the bottle, so that it completes its pivotal motion about the projection 21 as an axis of rotation until it is vertically aligned. It is to be understood that the angle at which the bumper plate 20 is set will vary depending upon the weight and shape of the various combinations of bottles with caps which may be passed through this bottle-orienting device. For this reason an adjustable bumper plate, such as is shown in Figure 7, may be used in lieu of the bumper plate 20 which is constructed integrally with the body of the inverting chute 19.

Figure 7:
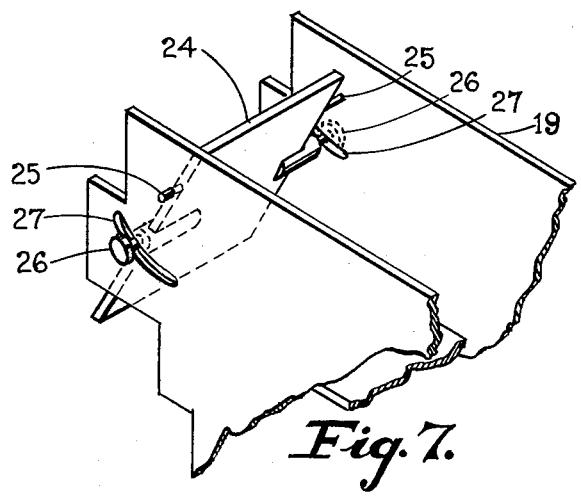
Figure 7 is a perspective view of an alternate adjustable construction of the bumper means.

Referring now to Figure 7, the bumper plate 24 is mounted in the inverting chute 19, in lieu of the bumper plate 20, by means of the pins 25. The angle at which the bumper plate 24 is set may be adjusted by means of the set screws 26 which pass through the slots 27 in the sides of the inverting chute 19.

The bumper plate 20 and the bumper plate 24 may be fashioned of metal or plastic or of any convenient material which has the proper resiliency characteristics.

Figure 8:
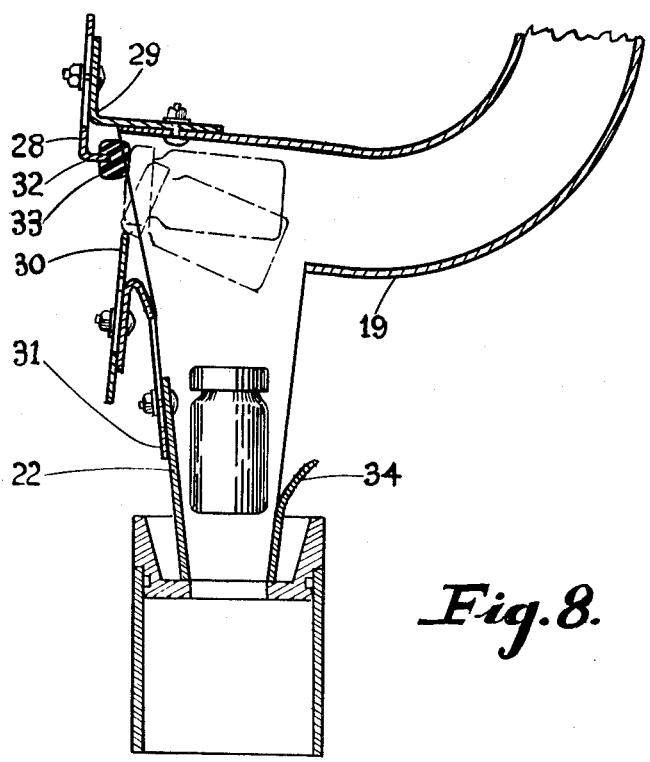
Figure 8 is a vertical cross-sectional view of another alternate adjustable construction of the bumper means.

Figure 8 shows an alternate means for converting the linear momentum of the capped bottles to pivotal momentum at the end of the inverting chute 19. This alternate means consists of the adjustable stop 28, which is adjustably mounted on a base plate 29, which is in turn adjustably mounted on the body of the inverting chute 19 at the end thereof. At the end of the inverting chute 19 there is also shown the projecting edge 30, which is adjustably mounted on a base plate 31, which is in turn adjustably mounted on the body of the vertical delivery chute 22. The adjustable stop 28 is provided with an edge 32 which is covered with a resilient material such as rubber, plastic, or any convenient material. The purpose of this resilient bumper 33 is to prevent damage to the cap of the bottle upon impact. The adjustable stop 28 is so adjusted that the cap of each bottle strikes the bumper 33 upon the upward side of the outer periphery of the top of the cap. The result of this off-center impact of the capped bottle upon the bumper 33 is to convert the linear momentum of the bottle into pivotal momentum. Thus, the bottom of the bottle is swung downwardly in an arcuate manner so that the long axis of the bottle approaches the vertical.

The adjustable projecting edge 30 is provided to further assist in aligning the falling and pivoting bottle by temporarily engaging the bottom edge of the cap of the bottle so that the bottle completes its pivotal motion about the projecting edge 30 as an axis of rotation until it is vertically aligned. However, the adjustable projecting edge 30 may be so adjusted as merely to strike the side of the cap of the bottle as it falls. It is to be understood that the adjustment of the adjustable stop 28 and of the projecting edge 30 will vary depending upon the weight and shape of the various combinations of bottles with caps which may be passed through the bottle-orienting device.

The adjustable stop 28 is adjustable both at right angles to the long axis of the bottles and laterally to the long axis of the bottles as they strike bumper 33, by reason of its being adjustably mounted by means of a nut and bolt arrangement on the base plate 29, which in turn is adjustably mounted upon the body of the inverting chute 19. However, the adjustable stop 28 and the base plate 29 may be constructed integrally so that the adjustable stop is adjustable only laterally to the long axis of the bottles as they strike bumper 33. The base plate 29 may be adjustably mounted by means of a nut and bolt arrangement either upon the body of the inverting chute 19 or upon a raised channel portion at the end of the inverting chute 19. The projecting edge 30 is adjustable both at right angles to the long axis of the bottles as they strike bumper 33, and laterally to the long axis of the bottles as they reach the desired vertical position in delivery chute 22, by reason of its being adjustably mounted by means of a nut and bolt arrangement upon the base plate 31, which in turn is adjustably mounted upon the body of the delivery chute 22. However, the projecting edge 30 and the base plate 31 may be constructed integrally so that the projecting edge is adjustable only laterally to the long axis of the bottles as they reach the desired vertical position in delivery chute 22. The base plate 31 may be adjustably mounted by means of a nut and bolt arrangement either upon the body of the delivery chute 22 or upon a raised channel portion thereon.

That part of the bottle-orienting device at the junction of the inverting chute 19 and the delivery chute 22 must be so dimensioned as to prevent "bridging" of the capped bottles being passed through the device. "Bridging" occurs when a capped bottle fails to properly pivot after impact with the bumper plates 20 or 24 or with the bumper 33 due to a faulty rebound. In such case, the bottle begins to fall into the delivery chute 22 with the long axis of the bottle at about right angles to the path of fall. Thereupon, pivotal momentum is finally imparted to the capped bottle only upon impact of the cap with the projection 21 or with the projecting edge 30 as the capped bottle falls crosswise through the delivery chute 22. In such case, the bottom of the bottle might strike the delivery chute 22 upon that side opposite to the bumper means and "bridging" might occur; that is, the capped bottle might jam crosswise in the delivery chute 22. In order to avoid such "bridging," the upper portion of delivery chute 22 upon that side opposite to the bumper means is cut away from the end of the floor of the inverting chute 19 down to the curved portion 34 which is bent somewhat outwards from the delivery chute 22. Such construction of the delivery chute 22 effectively aids in preventing "bridging." It is to be noted that the projection 21 and the projecting edge 30 are needed only because of the occasional faulty rebound of a capped bottle from the bumper means due to the inevitable variation in weight, shape, and composition of the bottles and caps of any particular combination.

Although the horizontal trough, vertical chute 5, inverting chute 19, and delivery chute 22 have been discussed as separate entities, they are preferably constructed integrally. Furthermore, the device may be economically constructed of metal or of plastic or of any convenient material.

An advantage of the inverting portion of the bottle orienting device of the present invention lies in the fact that it has no moving parts but merely utilizes the gravitational momentum of the falling capped bottles in order to accomplish the inversion of the bottles and their delivery upright upon an assembly line. Once the device has been constructed with the bumper plate 20 and the projection 21 properly dimensioned therein, or once the adjustments have been made to the adjustable bumper plate 24, or to the adjustable bumper 33 and to the projecting edge 30, which would depend upon the shape and weight of the capped bottles which are to be oriented in the device, the operation of the device is fully automatic and requires no maintenance or attention.

Having thus described my invention, what I claim as new, and desire to secure by Letters Patent is:

1. In a bottle-orienting apparatus, the combination with a substantially horizontal trough and a substantially vertical chute below and adjacent the delivery end of said trough, of a bottle-orienting trapeze comprising a pair of L-shaped suspending members parallel to but spaced from each other, means for rigidly connecting the suspending members mounted upon and between the lower portions of the vertical sections of the suspending members and adapted to prevent the body of a bottle from passing between the lower portions of the vertical sections of the suspending members, and a pair of inwardly opposed members mounted on the end portions of the horizontal sections of the suspending members, the ends of said inwardly opposed members being spaced apart so as to permit the neck but not the body of said bottle to pass between the ends of said inwardly opposed members, and said trapeze being swingingly mounted above said chute and adjacently spaced from the delivery end of said trough.

2. In a bottle-orienting apparatus, the combination with a substantially horizontal trough and a substantially vertical chute below and adjacent the delivery end of said trough, of a bottle-orienting trapeze comprising a pair of L-shaped suspending members parallel to but spaced from each other, means for rigidly connecting the suspending members, means mounted upon and between the lower portions of the vertical sections of the suspending members and adapted to prevent the body of a bottle from passing between the lower portions of the vertical sections of the suspending members, and a pair of inwardly opposed members mounted on the end portions of the horizontal sections of the suspending members, the ends of said inwardly opposed members being spaced apart so as to permit the neck but not the body of said bottle to pass between the ends of said inwardly opposed members, and said trapeze being swingingly mounted above said chute and adjacently spaced from the delivery end of said trough.

3. A bottle-inverting apparatus comprising a chute having a substantially vertical receiving portion and an upward curving portion below and communicating with said receiving portion, a substantially vertical delivery chute below and adjacent the delivery end of said upward curving portion, and bumper means mounted above said delivery chute and adjacently spaced from the delivery end of said upward curving portion adapted to contact the upward side of the outer periphery of the top of the cap of a capped bottle dropped cap-first into the receiving portion and moving through the upward curving portion whereby the linear momentum of said capped bottle is converted to pivotal momentum at the moment of contact of said capped bottle upon the bumper means.

References Cited in the file of this patent

UNITED STATES PATENTS

| | | |
|---|---|---|
| 1,950,077 | Benoit | Mar. 6, 1934 |
| 2,815,113 | Henderson et al. | Dec. 3, 1957 |